United States Patent
Kienke et al.

(10) Patent No.: US 7,784,872 B2
(45) Date of Patent: Aug. 31, 2010

(54) RECLINER MECHANISM

(75) Inventors: Ingo Kienke, Wermelskirchen (DE); Karthikeyan M. Subramanian, Burscheid (DE); Frank Weber, Odenthal (DE); Ralf Gutjahr, Kamen (DE)

(73) Assignee: Johnson Controls GmbH, Burscheid (DE)

( * ) Notice: Subject to any disclaimer, the term of this patent is extended or adjusted under 35 U.S.C. 154(b) by 375 days.

(21) Appl. No.: 11/663,872

(22) PCT Filed: Sep. 22, 2005

(86) PCT No.: PCT/EP2005/054746

§ 371 (c)(1),
(2), (4) Date: Nov. 12, 2007

(87) PCT Pub. No.: WO2006/034989

PCT Pub. Date: Apr. 6, 2006

(65) Prior Publication Data

US 2008/0203798 A1      Aug. 28, 2008

(30) Foreign Application Priority Data

Sep. 28, 2004   (DE) .................. 10 2004 047 420

(51) Int. Cl.
*B60N 2/02* (2006.01)
(52) U.S. Cl. ................................. 297/367 P
(58) Field of Classification Search ............. 297/366, 297/367 R, 367 P; 16/223, 239
See application file for complete search history.

(56) References Cited

U.S. PATENT DOCUMENTS

| 4,997,223 | A | 3/1991 | Croft |
| 2005/0156454 | A1* | 7/2005 | Fast ........................ 297/367 |
| 2005/0168034 | A1* | 8/2005 | Fast ........................ 297/367 |

FOREIGN PATENT DOCUMENTS

| DE | 35 11 871 A1 | 10/1985 |
| DE | 699 08 135 T2 | 4/2004 |
| GB | 1 060 922 | 3/1967 |
| GB | 2 156 901 A | 10/1985 |
| JP | 8196372 | 8/1996 |
| WO | WO 00/06414 A1 | 2/2000 |

* cited by examiner

*Primary Examiner*—Milton Nelson, Jr.
(74) *Attorney, Agent, or Firm*—Foley & Lardner LLP

(57) ABSTRACT

A recliner mechanism for a vehicle seat is provided. The recliner mechanism includes a first mounting part and a second mounting part forming a housing with an interior and being arranged on a common shaft. The recliner mechanism further includes a latching device arranged in the interior of the housing. The latching device has a latching pawl and a holding and adjusting member. The latching pawl is able to be adjusted to a locked position relative to the first mounting part. The holding and adjusting member is able to be reversibly adjusted from a first position effecting the locked position and a second position effecting an unlocked position by rotating the shaft. The holding and adjusting member rotates about a swivel pin that is provided substantially parallel to the shaft and is spaced apart therefrom.

20 Claims, 2 Drawing Sheets

RECLINER MECHANISM

CROSS-REFERENCE TO RELATED PATENT APPLICATIONS

The present application is a National Stage of International Application No. PCT/EP2005/054746 filed on Sep. 22, 2005, which claims the benefit of German Patent Application No. DE 10 2004 047 420.6 filed on Sep. 28, 2004. The entire disclosures of International Application No. PCT/EP2005/054746 and German Patent Application No. DE 10 2004 047 420.6 are incorporated herein by reference.

BACKGROUND

The present disclosure relates generally to a device for locking and unlocking the inclined adjustment of a first mounting part relative to a second mounting part. More particularly, the present disclosure relates to a device for locking and unlocking the inclined adjustment of a first mounting part relative to a second mounting part of a motor vehicle seat.

Devices for locking and unlocking the inclined adjustment of mounting parts relative to each other, such as for motor vehicle seats, are known. Such devices must be able to be unlocked easily and uniformly under a load (e.g., when using the device of a motor vehicle seat when a load is applied to the backrest). Further, such devices must satisfy high requirements relative to strength in order to withstand a continuous load (e.g., when used with motor vehicle seats). The requirements for the safety of the devices, especially against self-opening during an accident, are also very high.

German Publication No. DE 699 08 135 T2 discloses a device which is arranged in a housing and comprises a holding and adjusting means as well as a plurality of latching pawls. The holding and adjusting means is arranged fixedly in terms of rotation on a rotating shaft and is able to be rotated counter to the force of a force means. The latching pawls are unlocked so that the inclination of the mounting parts may be adjusted relative to each other.

There continues to be a need to provide a device for locking and unlocking the inclined adjustment of mounting parts relative to each other, especially of motor vehicle seats, that is intended to have improved safety against self-opening during an accident, especially when loaded from a preferred loading direction but is able to be easily unlocked, has a high strength, satisfies high requirements relative to the compensation of internal tolerances and, furthermore, is small, cost-effective, easy to install and cost-effective to install.

SUMMARY

One exemplary embodiment relates to a recliner mechanism for a vehicle seat. The recliner mechanism includes a first mounting part and a second mounting part forming a housing with an interior and being arranged on a common shaft. The recliner mechanism further includes a latching device arranged in the interior of the housing. The latching device has a latching pawl and a holding and adjusting member. The latching pawl is able to be adjusted to a locked position relative to the first mounting part. The holding and adjusting member is able to be reversibly adjusted from a first position effecting the locked position and a second position effecting an unlocked position by rotating the shaft. The holding and adjusting member rotates about a swivel pin that is provided substantially parallel to the shaft and is spaced apart therefrom.

Another exemplary embodiment relates to a recliner mechanism including a first mounting part and a second mounting part arranged on a shaft and a latching device for releasably securing the first mounting part relative to the second mounting part. The latching device includes first and second latching pawls, first and second holding and adjusting members and first and second swivel pins. The first and second latching pawls are supported in a first plane and movable relative to the first mounting part. The first and second holding and adjusting members are supported in the first plane, and each has at least a first operating cam that engages the first and second latching pawls respectively in a locked position. The first and second swivel pins rotatably support the first and second holding and adjusting members respectively and are spaced apart and substantially parallel to the shaft.

Another exemplary embodiment relates to a recliner mechanism including a first mounting part and a second mounting part arranged on a shaft and a latching device for releasably securing the first mounting part relative to the second mounting part. The latching device includes first and second latching pawls, first and second holding and adjusting members and first and second swivel pins. The first and second latching pawls are movable relative to the first mounting part. The first and second holding and adjusting members each have a first operating cam and a second operating cam. The first and second swivel pins rotatably support the first and second holding and adjusting members respectively and are spaced apart and substantially parallel to the shaft. The first operating cam of the first holding and adjusting member and the second operating cam of the second holding and adjusting member engage the first latching pawl in a locked position. The first operating cam of the second holding and adjusting member and the second operating cam of the first holding and adjusting member engage the second latching pawl in the locked position.

BRIEF DESCRIPTION OF THE DRAWINGS

The invention is described in more detail below with reference to the exemplary embodiment illustrated in the figures. The description below and the exemplary embodiment illustrated in the figures are given merely by way of example and do not restrict the general inventive idea.

DETAILED DESCRIPTION

Figure 1:
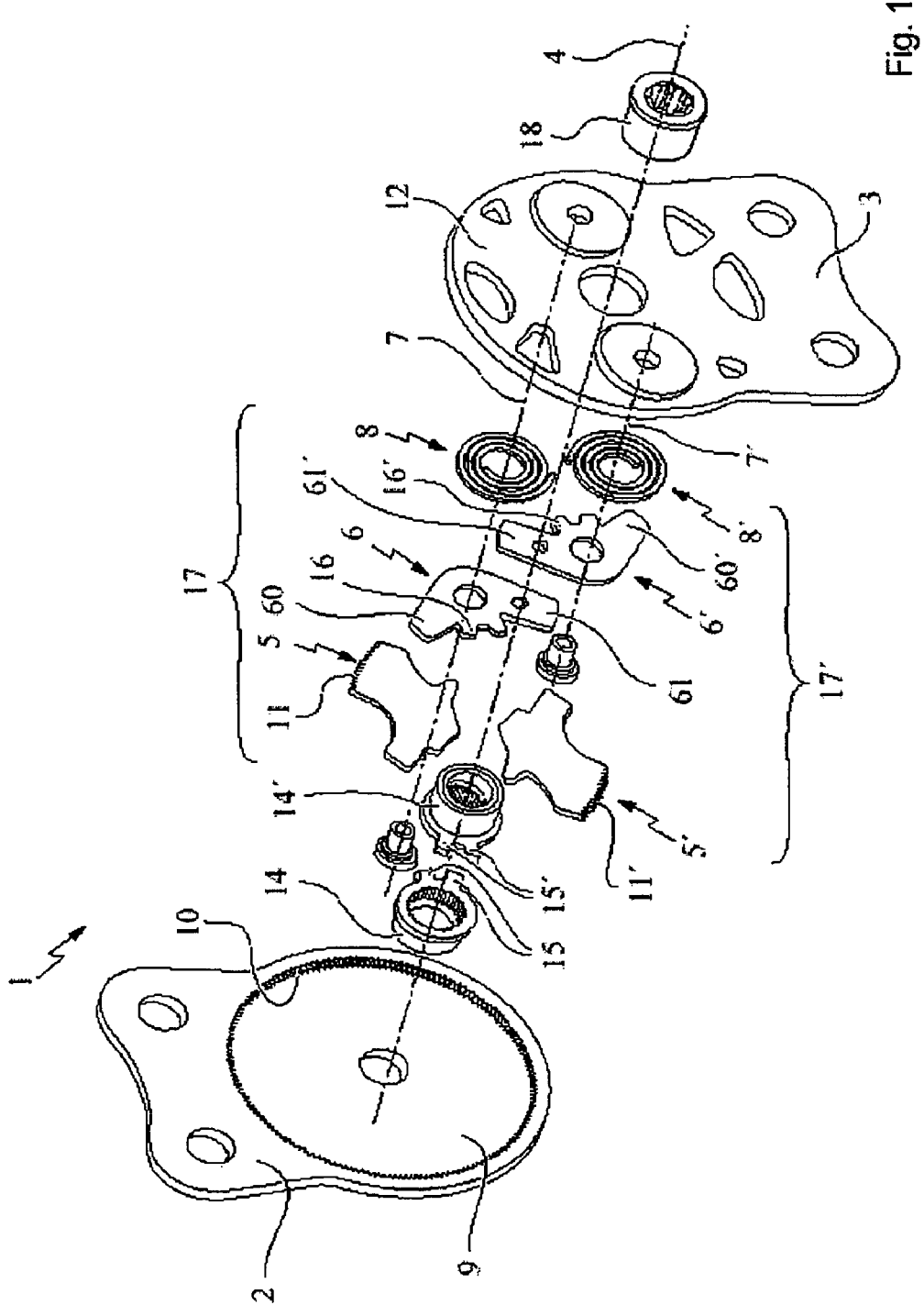
FIG. 1 shows an exploded perspective view of a device according to an exemplary embodiment.

According to an exemplary embodiment, a device for locking and unlocking the inclined adjustment of a first mounting part relative to a second mounting part is provided. Such a device may be used for a motor vehicle seat. The first mounting part and the second mounting part form a housing with an interior and are arranged on a common shaft. A latching means comprising a latching pawl as well as a corresponding holding and adjusting means is arranged in the interior of the housing. The latching pawl is able to be locked in a locked position relative to the first mounting part. The holding and adjusting means is able to be reversibly adjusted from a locked position effecting the latching into an unlocked position not effecting the latching by rotating the shaft. The holding and adjusting means rotates about a swivel pin that is provided substantially parallel to the shaft and spaced apart therefrom.

By spacing apart the swivel pin from the shaft, the shaft is substantially unloaded when the mounting parts are loaded relative to each other. For example, the mounting parts are loaded when a load is applied to the backrest of a motor vehicle seat comprising the device, especially during an accident, as the substantial forces act on the swivel pin during operation and/or during an accident.

By arranging the holding and adjusting means on a swivel pin spaced apart from the shaft, a more flexible arrangement of the components of the device is possible. Further, the relative position of the holding and adjusting means adapted to the latching pawl allows the device to be secured more expediently in a first direction (e.g., a direction from which the device is loaded, especially during an accident, for example the direction from which a belt load of a seat with an integral belt acts on the device during an accident, etc.). As a result, the locking of the device, especially when loaded from the first loading direction, is improved.

According to an exemplary embodiment, the device comprises a plurality of latching means. For example, the device may include two latching means. In such an embodiment, the adjustment of the inclination of the mounting parts relative to each other is ensured by a plurality of latching means, and/or in a redundant manner, so that the device is additionally improved with regard to safety against self-opening during an accident. Further, as a result of providing a plurality of latching means, the locking of the device may be improved, optionally with a plurality of loads from various loading directions.

According to an exemplary embodiment, the plurality of latching means each have one respective swivel pin. With one swivel pin, the device has a symmetrical construction so that in spite of an increased number of components, the number of different components is small. Such a configuration may be cost-effective with regard to storage. The components may be installed easily and possibly automatically and therefore cost-effectively. When unlocking a substantially symmetrical device, the shaft is substantially symmetrically loaded so that the forces acting thereon are at least partially compensated.

The forces which the swivel pins substantially absorb, especially during an accident, are at least partially compensated by a symmetrical arrangement of the latching means relative to each other and the loading of the individual components is at least partially reduced. Therefore, the components are at least partially able to be dimensioned to be less robust, which may allow for a more cost-effective material to be used. Further, the symmetrical arrangement of two latching means allows the swivel pins and the shaft to be located substantially in one plane.

According to an exemplary embodiment, the device comprises one rotating means per latching means. The rotating means are fixedly connected together in terms of rotation to the shaft by a securing means in a nominal position. The holding and adjusting means of the latching means is able to be adjusted by means of the rotating means. Such an embodiment has the advantage that the latching means are always arranged in a defined position relative to each other and are adjusted in a mutually dependent manner by means of the rotating means (e.g., always starting from the same relative arrangement to each other). As a result, the latching means may also be arranged relative to each other in a very small space so that they do not hinder each other when adjusted. As a result, the internal tolerances of one latching means are substantially independent of the internal tolerances of the other latching means and compensated toward the outside. As a result, the synchronization of a plurality of devices (e.g., adjusting a motor vehicle seat by connecting the shaft of two devices to each other) is more simple in comparison with the synchronization of a plurality of devices in which the swivel pin forms the shaft. According to an exemplary embodiment, a bushing is used as a securing means.

According to an exemplary embodiment, the rotating means comprise third positive and/or non-positive connection means and the holding and adjusting means comprise fourth positive and/or non-positive connection means that are at least partially in engagement with each other. The rotating means and/or the third and fourth positive and/or non-positive connection means transfer the unlocking torque from the shaft to the latching means.

According to an exemplary embodiment, the third and fourth positive and/or non-positive connection means are those which, even with—small—alterations to the position of the rotating means, relative to the latching means are still in engagement with each other and convey a uniform unlocking sensation to the user when unlocking the device. Therefore, the use of toothed portions is advantageous due to their uniform engagement with each other.

According to an exemplary embodiment, the device comprises one energy storage device per latching means. The holding and adjusting means of the latching means is able to be adjusted counter to the force of the energy storage device of the latching means from the locked position into the unlocked position. By means of the force of the energy storage device, each latching means is therefore secured in the locked position. The person skilled in the art understands that, according to the various alternative embodiments, the device has an energy storage device for securing a plurality of latching means in the locked position.

According to an exemplary embodiment, the first mounting part comprises a first positive and/or non-positive connection means, the at least one latching pawl has a second positive and/or non-positive connection means, and the first positive and/or non-positive connection means as well as the second positive and/or non-positive connection means are in engagement with each other in the locked position and not in engagement with each other in the unlocked position. According to an exemplary embodiment, the first and second positive and non-positive connection means are toothed portions. By means of the force of the energy storage device, the first and second positive and non-positive connection means are held in engagement.

According to an exemplary embodiment, the holding and adjusting means respectively comprise a first operating cam and a second operating cam. In the locked position of the holding and adjusting means, the first operating cam respectively cooperates with the corresponding latching pawl. The second operating cam has a securing surface that, in the locked position of the holding and adjusting means, additionally secures the latching pawl of the respectively adjacent or opposing latching means during an accident and is spaced apart from said latching pawl. For example, the securing surface may be spaced apart from the latching pawl by approximately 0.1-0.4 mm, particularly by approximately 0.2-0.3 mm. During an accident, the securing surfaces are located on the respective adjacent or opposing latching pawl. As a result, each latching pawl, especially during an accident, is doubly secured and the security against self-opening improved. Further, the internal supporting forces during an accident are directed symmetrically about the shaft, namely respectively via the bearing surfaces of the operating cam onto the latching pawls, whereby the strength and rigidity of the device, especially during an accident, is increased. Further, the shaft is substantially unloaded during an accident.

As the securing surface is spaced apart from the adjacent latching pawl, it is ensured that when locked it does not bear against the adjacent or opposing latching pawl, especially not before the first and second positive and non-positive connection means are in engagement with each other. Therefore, the latching pawls may be adjusted by means of the holding and adjusting means in an unhindered manner by the securing surfaces into the locked position. As a result, a substantially optimal engagement and, when using toothed portions as positive and/or non-positive connection means, a substantially optimal tooth engagement is always ensured of the first and second positive and/or non-positive connection means. According to an exemplary embodiment, the securing surface is substantially circular in order to ensure more reliably during the unhindered adjustment of the adjacent or opposing latching pawl from the unlocked position into the locked position.

Especially during an accident, the first operating cam of the holding and adjusting means holds the second positive and/or non-positive connection means of the latching pawl in a first direction in engagement with the first positive and/or non-positive connection means of the first mounting part. Because of the distance of the swivel pin from the shaft, this direction may be flexibly selected so that the locking of the device when loaded is improved, especially from a first loading direction which substantially coincides with this direction. The person skilled in the art understands that the supporting of the latching pawl on the first operating cam, when loaded, especially from the first loading direction, is also determined by the shape of the holding and adjusting means and the latching pawl, especially of the second positive and/or non-positive connection means and their engagement with the first positive and/or non-positive connection means of the first mounting part.

According to an exemplary embodiment, the second mounting part comprises a slotted link, against which the at least one latching pawl at least partially bears, so that during adjustment, the latching pawl is guided at least partially along the slotted link and therefore in a defined manner. In the unlocked position, the latching pawl is therefore displaced relative to the locked position. As the latching pawl always bears at least partially against the slotted link, the load receiving capacity of the device is very high, and namely when adjusting from and into the locked position as well as in the locked position and in the unlocked position. The latching pawl may be easily adjusted by the guide along the slotted link and does not slip. Moreover, because of the slotted link, no additional components are required to guide the latching pawl so that the number of components is low.

According to an exemplary embodiment, the latching pawl is formed such that the securing surface is removed from the latching pawl when adjusting the holding and adjusting means, before the second positive and/or non-positive connection means of the latching pawl are moved out of engagement with the first positive and/or non-positive connection means of the first mounting part by means of the first operating cam. According to an exemplary embodiment, the latching pawl has a projection that, when unlocking the latching pawl, comes to bear against the first operating cam, so that with further rotation of the operating cam about the rotating shaft, the latching pawl is displaced along the slotted link and the first and second positive and/or non-positive connection means come out of engagement. In such an embodiment, the adjustment is not hindered by the securing surface of the second operating cam.

By means of the arrangement of a plurality of latching means (e.g., two analogous latching means, which, by means of holding and adjusting means, of which the swivel pins are spaced apart relative to the rotating shaft, etc.), the locking of the device is improved when loaded, especially from a first loading direction. As the holding and adjusting means are respectively adjusted, starting from a nominal position, by means of rotating means, the internal tolerances of the device are substantially compensated toward the outside. By means of the arrangement of two operating cams, of which the first operating cam respectively secures the corresponding latching pawl against unlocking and the second operating cam respectively secures the adjacent or opposing latching pawl against unlocking, the security against self-opening, especially during an accident, as well as the strength and rigidity of the device is high. Moreover, forces which act on the device during an accident are directed around the unlocking shaft, as during an accident the latching pawl is respectively secured by the first operating cam of the corresponding holding and adjusting means and by the second operating cam of the adjacent or opposing holding and adjusting means. The latching pawl and the holding and adjusting means of the device are therefore supported against each other, whereby the device has a higher strength and rigidity. The symmetry of the device simplifies the assembly. When loaded, especially during an accident, the unlocking shaft is substantially unloaded.

Referring now to the Figures, FIG. 1 shows an exploded view of a recliner mechanism or device 1 according to an exemplary embodiment. The device 1 comprises a first mounting part 2 and a second mounting part 3. The first mounting part 2 and the second mounting part 3 are arranged on a common shaft 4 and form a housing with an interior. The inner surface 9 of the first mounting part 2, at least partially encompassing the interior, is shown in FIG. 1. In the interior of the housing, two latching devices or means 17, 17' are provided that respectively comprise a latching pawl 5, 5', a corresponding holding and adjusting member or means 6, 6', an energy storage device 8, 8', and a swivel pin 7, 7' that is provided substantially parallel to the shaft 4 and is spaced apart therefrom. According to the embodiment illustrated, the energy storage device 8, 8' is one respective spiral spring.

Figure 2:
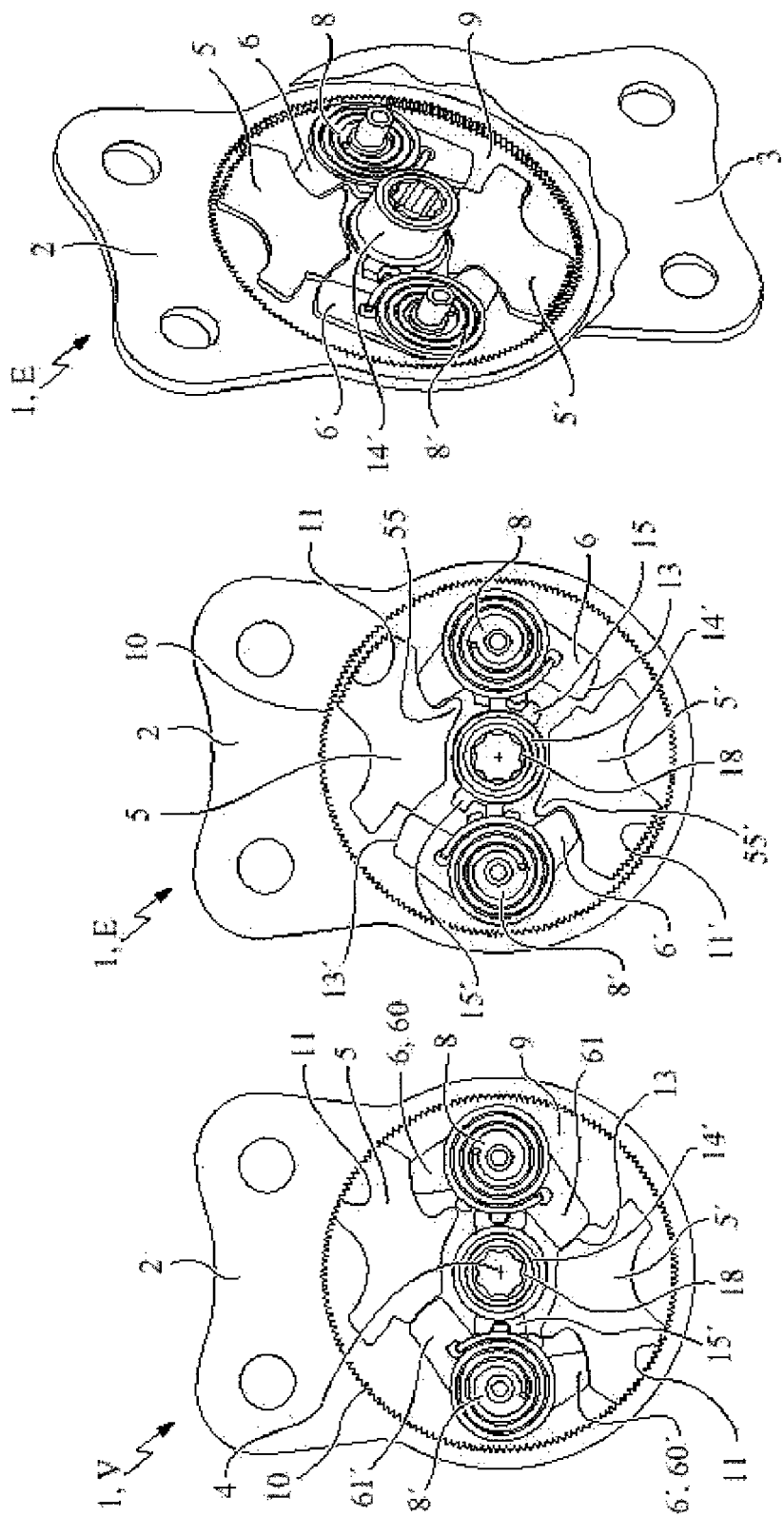
FIG. 2a shows a cross-sectional view of the device shown in FIG. 1 in a locked position.
FIG. 2b shows another cross-sectional view of the device shown in FIG. 1 in an unlocked position.
FIG. 2c shows a perspective view of the cross-sectional view shown in FIG. 2b.

The following embodiments apply respectively to both latching means 17, 17'. The holding and adjusting means 6, 6', as well as the energy storage device 8, 8' of the latching means 17, 17', are arranged on the swivel pin 7, 7' of the latching means 17, 17'. The person skilled in the art understands that the energy storage device 8, 8' may also be arranged differently, or that a plurality of energy storage devices 8, 8' may be replaced by a single energy storage device. The arrangement of the energy storage device 8, 8' on the swivel pin 7, 7' is advantageous for spatial reasons. The holding and adjusting means 6, 6', as well as the energy storage device 8, 8', are provided on the second mounting part 3. The holding and adjusting means 6, 6' has a first operating cam 60, 60', which is shown in FIG. 2a, that cooperates with the corresponding latching pawl 5, 5' of the latching means 17, 17' in a locked position V, in which the inclination of the first mounting part 2 relative to the second mounting part 3 is secured against adjustment by means of the force of the corresponding energy storage device 8, 8'. In this locked position V, a first connector or positive and/or non-positive connection means 10 of the first mounting part 2 is in engagement with a second connector or positive and/or non-positive connection means 11, 11' of the latching pawl 5, 5'. The holding and adjusting means 6, 6' is also shown as having a second operating cam 61, 61', which is shown in FIG. 2a, that has a securing surface 13, 13' that is spaced apart from the latching pawl 5, 5' of the adjacent or opposing latching means 17, 17' which, in the embodiment illustrated, is the other latching means and secures this latching means 17', 17 in the locked position V additionally against self-opening during an accident. The holding and adjusting means 6, 6' is further shown as having a fourth connector or positive and/or non-positive connection means 16, 16' (e.g., a toothed portion, etc.) that is in engagement with a third connector or positive and non-positive connection means 15, 15' (e.g., a toothed portion, etc.), of a rotating means 14, 14' that is arranged fixedly in terms of rotation on the shaft 4 by means of a securing means 18 (e.g., a bushing, etc.) so that when rotating the shaft 4 clockwise, the holding and adjusting means 6, 6' is adjusted reversibly by means of the third positive and/or non-positive connection means 16, 16' and the fourth positive and/or non-positive connection means 15, 15' from the locked position V into an unlocked position E, the holding and adjusting means 6, 6' rotating against the force of the energy storage device 8, 8' about the swivel pin 7, 7'. The person skilled in the art, understands that even the rotationally fixed connection of a plurality of rotating means 14, 14' to the shaft 4 (e.g., a bushing 18, etc.) may be made substantially without play. When rotating the holding and adjusting means 6, 6' clockwise, the first operating cam 60, 60' of the holding and adjusting means 6, 6' is brought to bear against a projection 55, 55' (shown in FIG. 2b) of the corresponding latching pawl 5, 5' and displaces the latching pawl 5, 5' along a slotted link 12 that is provided on the second mounting part 3, and against which the latching pawl 5, 5' bears at least partially. As a result, the second positive and/or non-positive connection means 11, 11' of the latching pawl 5, 5' is no longer in engagement with the first positive and/or non-positive connection means 10 of the first mounting part 2 so that the inclination of the first mounting part 2 may be adjusted in the unlocked position E relative to the second mounting part 3. When rotating the holding and adjusting means 6, 6' about the swivel pin 7, 7', the second operating cam 61, 61' is adjusted such that it does not hinder the adjacent latching pawl 5, 5' when displaced along the slotted link 12. According to an exemplary embodiment, the holding and adjusting means 6, 6' comprises a circular securing surface 13, 13' so that the holding and adjusting means 6, 6' may be adjusted unhindered by the adjacent latching pawl 5', 5 from the locked position V into the unlocked position E. The securing surface 13, 13' is spaced apart from the latching pawl 5', 5 so that when adjusting from the unlocked position E into the locked position V, the holding and adjusting means 6, 6' does not also become jammed with the adjacent latching pawl 5', 5. Therefore, the first positive and/or non-positive connection means 10 and the second positive and/or non-positive connection means 11, 11' are always substantially in engagement with each other in the locked position V.

FIGS. 2a and 2b show a cross section transversely to the shaft 4 through the device 1 according to the exemplary embodiment illustrated in FIG. 1, while FIG. 2c is a perspective view of the cross section of FIG. 2b. FIG. 2a shows the device 1 in the locked position V, while FIGS. 2b and 2c show the device 1 in the unlocked position E of the holding and adjusting means 6, 6'. The second mounting part 2 is visible as well as two latching means 17, 17' which are arranged in the interior of the housing, point symmetrically to the shaft 4, which is indicated by a cross. The interior of the housing is at least partially encompassed by the inner surface 9 of the second mounting part 2. FIGS. 2a-2c show the latching pawls 5, 5' respectively with the second positive and/or non-positive connection means 11, 11', the holding and adjusting means 6, 6' respectively with the first operating cam 60, 60', the second operating cam 61, 61', the securing surface 13, 13' as well as the fourth positive and/or non-positive connection means 16, 16', the energy storage device 8, 8' and the rotating means 14, 14' respectively with the third positive and/or non-positive connection means 15, 15'. In FIG. 2a, the second positive and/or non-positive connection means 11, 11' of the latching pawls 5, 5' is respectively in engagement with the first positive and/or non-positive connection means 10 of the first mounting part 2 and secured by means of the first operating cam 60, 60' of the corresponding holding and adjusting means 6, 6'. The second operating cam 61, 61' secures the respective adjacent or opposing latching pawl 5', 5 in the locked position V of the holding and adjusting means 6, 6' during an accident. In FIGS. 2b and 2c, the holding cams 6, 6' respectively bear against the corresponding latching pawl 5, 5' and the second positive and/or non-positive connection means 11, 11' are not in engagement with the first positive and/or non-positive connection means 10 of the first mounting part 2. The device 1 is, therefore, in the unlocked position E from which the device 1 may be adjusted, starting from the locked position V, by rotating the shaft 4 clockwise, the first operating cam 60, 60' coming to bear against a projection 55, 55' of the latching pawl 5, 5' and displacing said latching pawl along the slotted link 12 so that the first and second positive and/or non-positive connection means 10, 11' are out of engagement. As a result, in the unlocked position E of the holding and adjusting means 6, 6', the inclination of the first mounting part 2 may be adjusted relative to the second mounting part 3, which is visible in FIG. 2c.

The invention claimed is:

1. A recliner mechanism for a vehicle seat comprising:
a first mounting part and a second mounting part forming a housing with an interior and being arranged on a common shaft;
a latching device arranged in the interior of the housing, the latching device having a latching pawl and a holding and adjusting member, the latching pawl configured to be adjusted to a locked position relative to the first mounting part, the holding and adjusting member configured to be reversibly adjusted from a first position effecting the locked position and a second position effecting an unlocked position by rotating the shaft, wherein the holding and adjusting member rotates about a swivel pin that is provided substantially parallel to the shaft and is spaced apart therefrom, wherein the latching device comprises a plurality of latching devices, wherein the plurality of latching devices comprises a first latching device and a second latching device, wherein the first latching device and the second latching device each have one respective swivel pin, and
a first rotating member and a second rotating member that are connected together fixedly in terms of rotation to the shaft by a securing member in a nominal position, the first rotating member adjusts the positioning of the holding and adjusting member of the first latching device, the second rotating member adjusts the positioning of the holding and adjusting member of the second latching device.

2. The recliner mechanism of claim 1 wherein the first rotating member and the second rotating member comprise third connectors and the holding and adjusting members of the first latching device and the second latching device comprise fourth connectors that are at least partially in engagement with the third connectors.

3. The recliner mechanism of claim 1, further comprising a first energy storage device for the first latching device and a second energy storage device for the second latching device, the holding and adjusting members of the first latching device and the second latching device configured to be adjusted counter to the force of the first energy storage device and the second energy storage device respectively between the first position and the second position.

4. The recliner mechanism of claim 1 wherein the second mounting part comprises a slotted link against which the latching pawl at least partially bears.

5. The recliner mechanism of claim 1 wherein the first mounting part comprises a first connector and the latching pawls of the first latching device and the second latching device each have a second connector, the first connector and the second connector are in engagement with each other when the latching pawls are in the locked position and are not in engagement with each other when the latching pawls are in the unlocked position.

6. The recliner mechanism of claim 5 wherein the holding and adjusting members of the first latching device and the second latching device each comprise a first operating cam and a second operating cam, the first operating cam engaging the corresponding latching pawl in the locked position, the second operating cam having a securing surface engaging the opposing latching pawl in the locked position and being spaced apart from the opposing latching pawl in the unlocked position.

7. The recliner mechanism of claim 6 wherein the securing surface is substantially circular.

8. The recliner mechanism of claim 6 wherein the securing surface of the second operating cam is spaced apart from the opposing latching pawl in the unlocked position a distance that is between approximately 0.1 mm and approximately 0.4 mm.

9. The recliner mechanism of claim 8 wherein the securing surface of the second operating cam is spaced apart from the opposing latching pawl in the unlocked position a distance that is between approximately 0.2 mm and approximately 0.3 mm.

10. A recliner mechanism for a vehicle seat comprising:
a first mounting part and a second mounting part forming a housing with an interior and being arranged on a common shaft, the second mounting part comprising a slotted link against which the latching pawl at least partially bears;
a latching device arranged in the interior of the housing, the latching device having a latching pawl and a holding and adjusting member, the latching pawl configured to be adjusted to a locked position relative to the first mounting part, the holding and adjusting member configured to be reversibly adjusted from a first position effecting the locked position and a second position effecting an unlocked position by rotating the shaft,
wherein the holding and adjusting member rotates about a swivel pin that is provided substantially parallel to the shaft and is spaced apart therefrom.

11. The recliner mechanism of claim 10 wherein the latching device comprises a plurality of latching devices.

12. The recliner mechanism of claim 11 wherein the plurality of latching devices comprises a first latching device and a second latching device.

13. The recliner mechanism of claim 12 wherein the first latching device and the second latching device each have one respective swivel pin.

14. A recliner mechanism comprising:
a first mounting part and a second mounting part arranged on a shaft; and
a latching device for releasably securing the first mounting part relative to the second mounting part, the latching device comprising:
first and second latching pawls supported in a first plane and movable relative to the first mounting part;
first and second holding and adjusting members supported in the first plane, each having at least a first operating cam that engages the first and second latching pawls respectively in a locked position, the first and second holding and adjusting members each having a second operating cam, the second operating cam of the first holding and adjusting member engages the second latching pawl in the locked position, the second operating cam of the second holding and adjusting members engages the first latching pawl in the locked position; and
first and second swivel pins for rotatably supporting the first and second holding and adjusting members respectively, the first and second swivel pins being spaced apart and substantially parallel to the shaft.

15. The recliner mechanism of claim 14 wherein the second mounting part comprises a slotted link against which the latching pawl at least partially bears.

16. The recliner mechanism of claim 14 wherein the second operating cams of the first and second holding and adjusting members are spaced apart from the second and first latching pawls respectively in an unlocked position.

17. The recliner mechanism of claim 16 wherein the second operating cams of the first and second holding and adjusting members are spaced apart from the second and first latching pawls respectively in the unlocked position a distance between approximately 0.1 mm and approximately 0.4 mm.

18. A recliner mechanism comprising:
a first mounting part and a second mounting part arranged on a shaft; and
a latching device for releasably securing the first mounting part relative to the second mounting part, the latching device comprising:
first and second latching pawls movable relative to the first mounting part;
first and second holding and adjusting members each having a first operating cam and a second operating cam; and
first and second swivel pins for rotatably supporting the first and second holding and adjusting members respectively, the first and second swivel pins being spaced apart and substantially parallel to the shaft,
wherein the first operating cam of the first holding and adjusting member and the second operating cam of the second holding and adjusting member engage the first latching pawl in a locked position, and wherein the first operating cam of the second holding and adjusting member and the second operating cam of the first holding and adjusting member engage the second latching pawl in the locked position.

19. The recliner mechanism of claim 18 wherein the latching device further comprises first and second energy storage devices for biasing the first and second holding and adjusting members into the locked position respectively.

20. The recliner mechanism of claim 18 wherein the latching device further comprises first and second rotating members coupled to the shaft and fixedly coupled relative to each other, the first rotating member engaging the first holding and adjusting member, the second rotating and the second rotating member engaging the second holding and adjusting member.

* * * * *